US008264811B1

(12) United States Patent
Green

(10) Patent No.: US 8,264,811 B1

(45) Date of Patent: Sep. 11, 2012

(54) APPARATUS FOR THE DISPERSAL AND DISCHARGE OF STATIC ELECTRICITY

(76) Inventor: Richard Douglas Green, Portland, OR (US)

(*) Notice: Subject to any disclaimer, the term of this patent is extended or adjusted under 35 U.S.C. 154(b) by 304 days.

(21) Appl. No.: 12/718,954

(22) Filed: Mar. 6, 2010

Related U.S. Application Data

(60) Provisional application No. 61/209,375, filed on Mar. 5, 2009.

(51) Int. Cl.

| | |
|---|---|
| ***H02H 1/00*** | (2006.01) |
| ***H02H 1/04*** | (2006.01) |
| ***H02H 3/22*** | (2006.01) |
| ***H05F 3/00*** | (2006.01) |
| ***H05F 3/02*** | (2006.01) |

(52) U.S. Cl. ........................................................ 361/212

(58) Field of Classification Search ................... 361/212

See application file for complete search history.

(56) References Cited

U.S. PATENT DOCUMENTS

| | | | | |
|---|---|---|---|---|
| 5,055,963 | A * | 10/1991 | Partridge | 361/231 |
| 5,719,739 | A | 2/1998 | Horiguchi | |
| 6,219,218 | B1 | 4/2001 | Nial et al. | |
| 6,373,680 | B1 * | 4/2002 | Riskin | 361/231 |
| 6,628,499 | B1 * | 9/2003 | Kim | 361/225 |
| 7,054,129 | B2 | 5/2006 | Aida et al. | |
| 7,965,487 | B2 * | 6/2011 | Seto et al. | 361/213 |
| 2011/0278984 | A1 * | 11/2011 | Chun | 310/305 |

* cited by examiner

*Primary Examiner* — Dharti Patel

(57) ABSTRACT

An apparatus for the collection and discharge of static electrical charges without the need for an earth ground or atmosphere. This apparatus has three major parts: a collector stage, a conversion stage, and an emissive stage. The collection stage, an apparatus that can carry a static charge from the environment external to the apparatus, is connected electrically to the conversion stage, comprising one or more layers of a material that can carry an electrical charge, disposed among two or more layers of a material that can carry an electrical charge, which layers are in turn connected electrically to components so as to trap the electrical charges in an electromagnetic field and convert them into electrical energy. Finally, the electrical output of the conversion stage is electrically connected to an emissive stage: comprising a transducing device or circuit capable of utilizing the energy or emitting it.

20 Claims, 6 Drawing Sheets

Section 2-2

Section 3-3

APPARATUS FOR THE DISPERSAL AND DISCHARGE OF STATIC ELECTRICITY

This application claims the benefit of priority of U.S. Provisional Patent Application 61/209,375, filed 5 Mar. 2009 by the present inventor.

FIELD OF THE INVENTION

The present invention relates to the accumulation of electrical charges and charged particles, and a means by which these may be dissipated or discharged by controlled decay without the need for an earth ground or atmosphere.

BACKGROUND OF THE INVENTION

Static electricity has been characterized in several ways: as positive or negative charged particles, as an excess of electrical charges; as charge imbalances in different regions on or in a substance; as a separation of charges. Such charges build up in a variety of circumstances, and in the normal course of things, the excess charge is dispersed or neutralized in materials, or by atmospheric conditions, or they can be discharged by bonding to earth ground or another sink that can absorb them. This transfer of charge is commonly called ESD (for ElectroStatic Discharge), and takes place under many conditions and with a wide range of charge accumulation and resultant voltages and currents. When excess charge can be dissipated or drained to earth ground as it builds up, the danger to people and equipment from ESD can be minimized. However, when the charge cannot be drained or dissipated it can accumulate to such a degree that an electrostatic discharge is damaging.

There are many places in which static electricity builds up with no way to drain it via electrical bonding to an earth ground. Many devices and methods have been developed that attempt to deal with this problem. Static electricity is a tremendous problem in the manufacture of electronic components. In 2003, it was estimated that despite active programs to deal with ESD, the global electronic industry lost approximately $84 billion USD due to damage from ESD. The industry worldwide has worked for years to limit the pulse damage caused by ESD—whether from humans or charged devices. Some products for use in these areas utilize an excessive number of charged ions to help neutralize the static charge build-up in nearby air. The use of coatings, sprays, and embedded conductive particulates (e.g., carbon black) are used to dissipate excess charge and carry it to ground. Corona-discharge devices are also used, and allow ESD to ionize atoms and molecules in the air as the charge streams off the tip.

Aerospace provides other examples of the hazards of the buildup of excess charge. Spacecraft have no robust way of disposing of static electricity as it accumulates. Spacecraft vessel components (frame, trusses, hull) act as a massive sink or ground reference plane, and excess charge is theoretically drained or neutralized there (e.g., ISS SSP 30240 in re: conductive structures providing a stable sink). The problem is exacerbated as the vessel moves through the plasma of space, and even more charge accumulates over time. Astronauts must deal with static shocks between themselves and their equipment caused by the build-up of charge. Aircraft accumulate excess charge as they move through the air or even in rain ("precipitation static"), and this must be dissipated to avoid damage to equipment and cause radio interference.

Still another example of the dangers of charge accumulation is the hazard of premature detonation of solid propellants, pyrotechnics and explosive charges due to ESD. Procedures have been developed over time to keep ordnance safe as it is mounted onto and de-mounted off military aircraft, and in each of these care is taken to bond the ordnance to a ground plane. Field radios are susceptible to damage from ESD. Helicopters rotors generate visible sparks as they land in dusty environments due to charged particle accumulation. Rescue crews have to deal with high voltage ESD in cables lowered to the ground from helicopters. Aerospace avionics have to be shielded especially to protect them from charge buildup and ESD.

This invention describes an apparatus by which static electricity, or charged particles, can be neutralized or dissipated without the need for an earth ground or atmosphere.

Much background art exists with regard to static electricity: its generation, accumulation, methods of dissipation, and controlling its discharge. There are many methods for dispersing or neutralizing excess charge, such as sprays, polar molecules and carbon black embedded in work surfaces and floors to make them conductive. Air ionization is a popular method of neutralizing a static charge in the air, by emitting charges opposite to those in the air. Corona discharge from fine-pointed needles or wicks is also used to control ESD, the excess charge being emitted to the atmosphere via the needle. Even small amounts of excess charge can damage semiconductor devices, and one method for dealing with this is to create dissipative structures within the chip design. Devices and methods that can actually drain the static charges (e.g., the use of a ground strap on the wrist of an electronics worker) require bonding to an earth ground.

Some extant devices and methods for controlling ESD simply disperse or dissipate charge, but do not get rid of it. Other methods such as air ionization, or corona discharge or similar methods, are also not always practical or effective, especially in the absence of an atmosphere. Resistance gradients and hysteresis phenomena in the atmosphere disallow reliable discharge. Methods that drain excess static charges require electrical bonding to an earth ground, and are not effective in areas where bonding to ground is impractical, where charge dissipation is imperfect, or where an earth ground doesn't exist.

SUMMARY OF THE INVENTION

There are three major sections to this apparatus: the collection section, the conversion section, and the emitter section. The collector section, comprising an apparatus capable of carrying a electrical charge, is connected electrically to one or more plates or meshes also capable of carrying a electrical charge, which are disposed between (without touching) two or more outer plates or meshes, capable of carrying electrical charge, which are in turn connected electrically to components and circuits which can trap the electrical charges and convert them into electrical current. If needed, a voltage source is provided, to bias the outer plates and create an electrical field. The center plates or meshes, the outer plates, and the electrical components make up the conversion section of the apparatus. Finally, the electrical output of the conversion section is electrically connected to a device or circuit capable of using the voltage and current produced in the conversion section to emit light, sound, heat or other form of energy. This last portion is the emitter section of the apparatus.

Accordingly, several advantages include that this apparatus works without the need for bonding to an earth ground nor a need for atmosphere. It works with different species of charged particles. Further advantages will become apparent from a study of the following description and the accompanying drawings.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
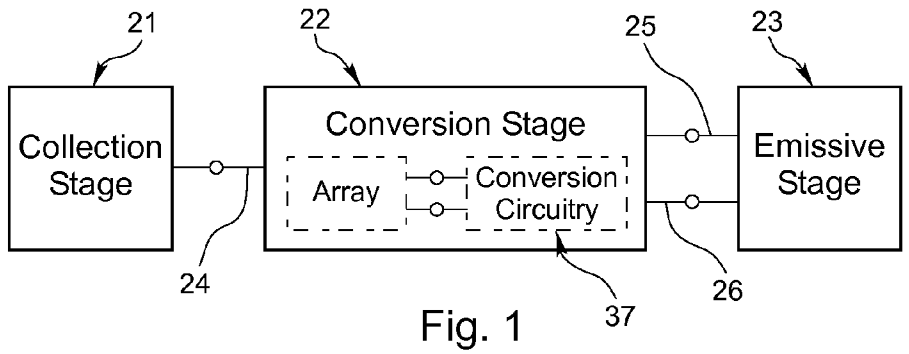
FIG. 1 is a block diagram view of the three major sections of the apparatus.

FIG. 1 is a block diagram of the three sections of the apparatus: the collector stage 21, the conversion stage 22, and the emissive stage 23. It illustrates how the collector stage 21 is connected to the conversion stage 22 by the collector 27-to-grid connection, and how the conversion stage 22 is connected to the emissive stage 23 by the anode-to-emitter connection 25 and the cathode-to-emitter connection 26. The collector stage 21 is electrically connected to the source of the electrical charges or charged particles through bonding to the external environment. The conversion stage 22 comprises two sub-stages: an array, arranged as a series of one or more center layers about which are disposed one or more outer layers that entrain charges or charged particles. These outer layers are in turn electrically connected to the conversion circuitry 37, comprising electrical components that convert the entrained charges into usable current. Finally, the emissive stage 23, electrically connected to the conversion circuitry 37, allows for the charge to be converted into other forms of energy or used as electrical energy.

Figure 2:
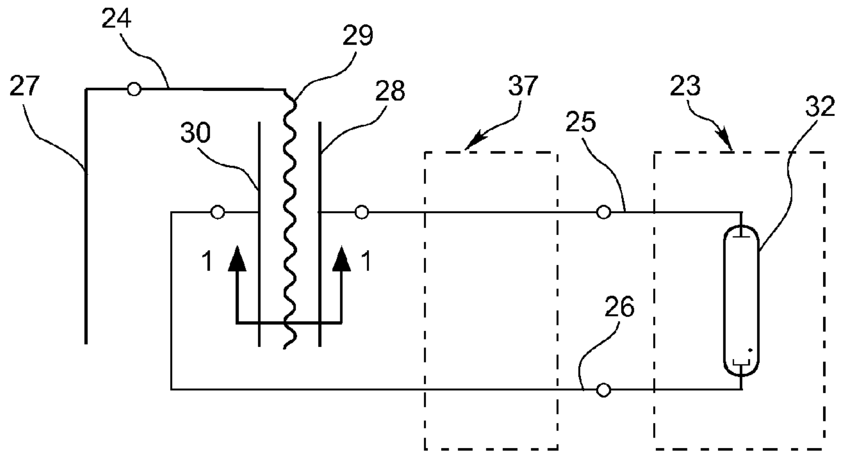
FIG. 2 is a circuit view of an embodiment of the apparatus, which illustrates the electrical relationships among the major components of the apparatus.

FIG. 2 is an electrical circuit diagram of one embodiment of the apparatus. The collector 27, capable of carrying electric charge, is electrically connected to the source of the electrical charges or charged particles, and is in turn electrically connected to a center layer, a conductive grid(s) (which may be one or more meshes or plates), also capable of carrying electric charge, by the collector 27-to-grid connection 24. The center layer(s) 29—in one embodiment, a mesh—is disposed between one or more anode layer(s) 28, as plate(s) (or meshes) capable of carrying electric charge, and one or more cathode layer(s) 30, as plate(s) (or meshes) also capable of carrying electric charge. Between the center grid(s) and the anode plate(s) are disposed one or more anode dielectric layers, and between the center grid(s) and the cathode layer(s) 30 are disposed one or more cathode dielectric layers. These dielectric layers may comprise air, vacuum, or other material. The cathode plate(s) and anode plate(s) may be electrically connected to conversion circuitry 37 arranged such that the current generated will flow in one direction. A power supply 36 (not shown) and other electrical components (such as capacitors) may be inserted to provide a bias and maintain an electric field between the anode plate(s) and cathode plate(s). Finally, the anode-to-emitter connection 25 and cathode-to-emitter connection 26 are electrically connected to the emissive device 32, which may be such devices and associated circuitry as a flash tube, gas discharge tube, light-emitting diode, or piezoelectric device, or other transducing device which can convert electrical energy into another form of energy. The number of grids and plates, their area, the distance between them and the thickness of the dielectrics will depend upon the charge to be captured and converted and its characteristics.

Figure 3A:
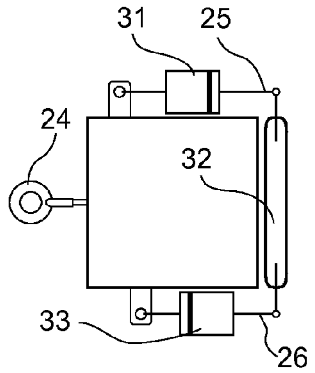
FIG. 3*a* is a top plan view of an embodiment of the apparatus, illustrating the physical relationships among the components.

FIG. 3*a* illustrates one embodiment of the apparatus, showing the physical relationships among the components, namely the collector-to-array connection 24, the package of the array of grids and plates, the anode layer diode 31, the cathode layer diode 33, and a gas discharge tube as the emissive device 32. The connector is used to provide an electrical connection to the environment external to the apparatus.

Figure 3B:
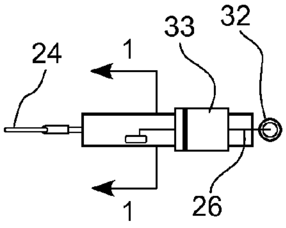
FIG. 3*b* is a side elevation view of the embodiment of the apparatus in FIG. 3*a*, illustrating the physical relationships among the components.

FIG. 3*b* is a side elevation of the embodiment of FIG. 3*a*, showing the physical relationships among the components.

Figure 3C:
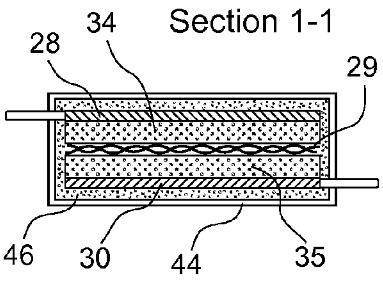
FIG. 3*c* is a section view of the embodiment shown in FIG. 3*a*, illustrating the layers of the array sub-stage.

FIG. 3*c* (Section 1-1) is a cross-section of the embodiment of FIG. 3*a*. It illustrates how the center grid(s) is/are disposed between the anode plate(s) and the cathode plate(s) without touching either. It also illustrates how the anode dielectric layer(s) 34 are disposed between the center grid(s) and the anode plate(s) and the cathode dielectric layer(s) 35 are disposed between the center grid(s) and the cathode plate(s). Illustrated also is a dielectric layer around the array and a protective coating 44 applied around the outer surface.

Figure 4:
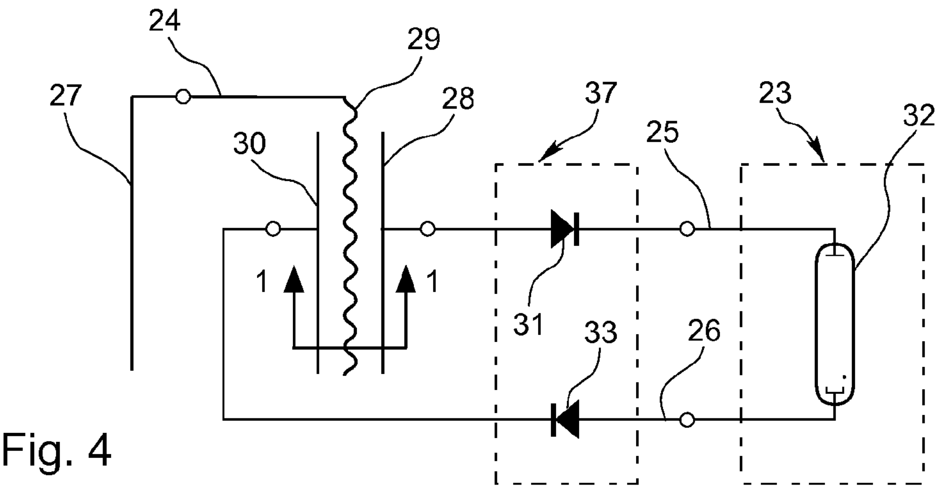
FIG. 4 is a circuit view of an embodiment of the apparatus which illustrates diodes in the conversion circuitry and a gas discharge tube as the emissive device.

FIG. 4 is an electrical circuit diagram of another embodiment of the apparatus of FIG. 2, to which the diodes have been added as the conversion circuitry 37. In addition, it illustrates the use of another type of gas discharge tube (e.g., a HeNe laser tube) as the emissive device 32.

Figure 5:
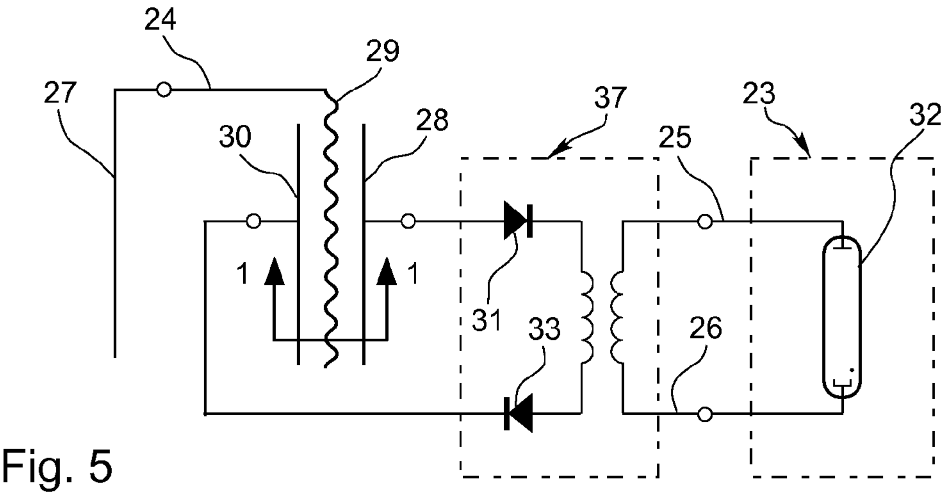
FIG. 5 is a circuit view of an embodiment of the apparatus which illustrates inductors in the conversion circuitry and a gas discharge tube as the emissive device.

FIG. 5 is an electrical circuit diagram of another embodiment of the apparatus of FIG. 4, to which inductors have been added to the conversion circuitry 37.

Figure 6:
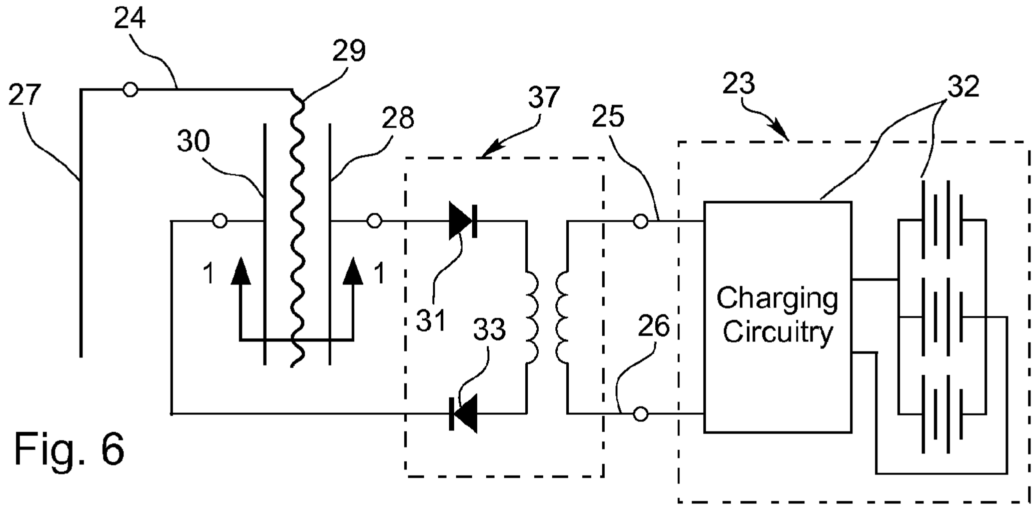
FIG. 6 is a circuit view of an embodiment of the apparatus, illustrating a charging system as the emissive stage.

FIG. 6 is an electrical circuit diagram of another embodiment of the apparatus of FIG. 4, illustrating the application of charging circuitry and batteries as the emissive devices.

Figure 7:
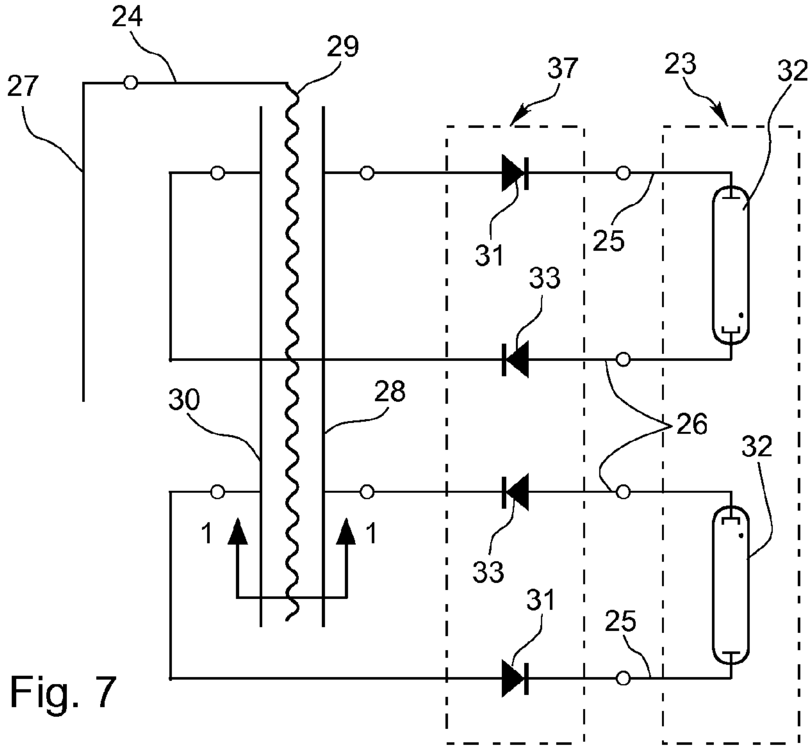
FIG. 7 is a circuit view of an embodiment of the apparatus shown in FIG. 2, showing a second set of diodes and a second emissive device.

FIG. 7 is an electrical circuit diagram of another embodiment of the apparatus of FIG. 2, showing a second set of diodes and a second emissive device 32 (in this case, a gas discharge tube). This second set of diodes are connected in a manner opposite to the diodes shown in FIGS. 2, 4, 5 and 6, and may be used in certain conditions to ensure that both positively and negatively charged particles are trapped and the resulting current carried to the emissive device 32.

Figure 8A:
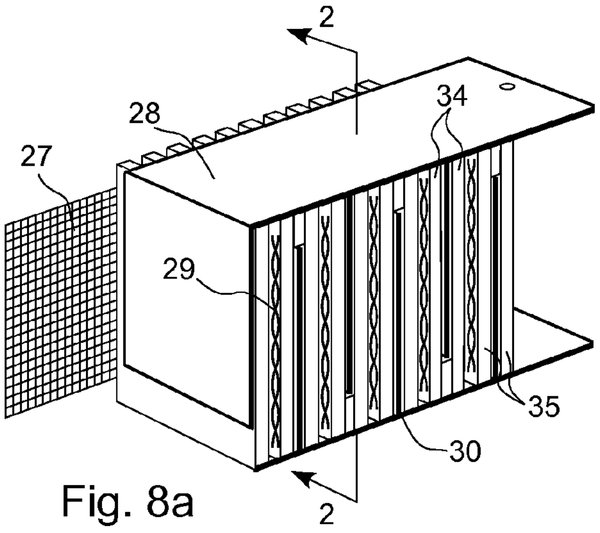
FIG. 8*a* is a perspective view of an embodiment of part of the conversion section of the apparatus, illustrating a number of center layers disposed between a number of anode and cathode layers.

FIG. 8*a* illustrates one embodiment of the apparatus, showing the physical relationships among the components, namely the array sub-system in the conversion stage 22. It illustrates the package of the array of grids and plates and the several dielectric layers.

Figure 8B:
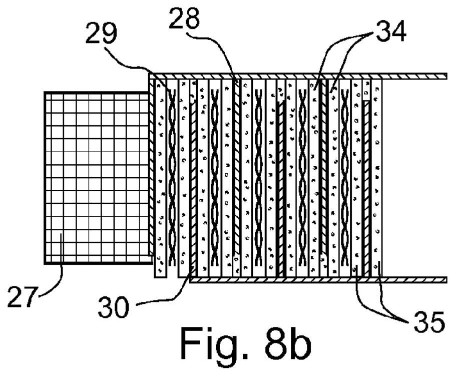
FIG. 8*b* is a section view of the embodiment shown in FIG. 8*a;*

FIG. 8*b* (Section 2-2) is a cross-section of the embodiment in FIG. 8*a*.

Figure 9:
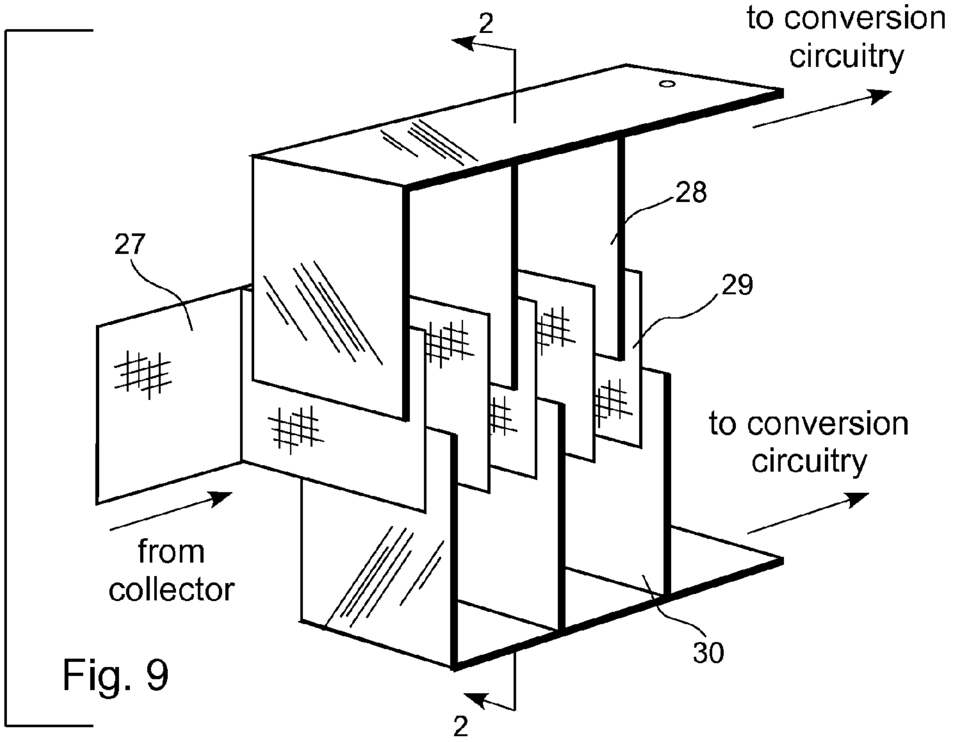
FIG. 9 is an exploded view of an embodiment of part of the conversion array sub-stage of the invention shown in FIG. 8*a*, illustrating multiple center layers disposed among multiple anode and cathode layers (for the sake of clarity, the dielectric layers are not shown)

FIG. 9 is an exploded perspective mechanical view of one embodiment of the conversion section of the apparatus, illustrating how multiple center grid(s) are disposed between multiple anode plate(s) and cathode plate(s). For the sake of clarity, the dielectric layers are not shown.

Figure 10A:
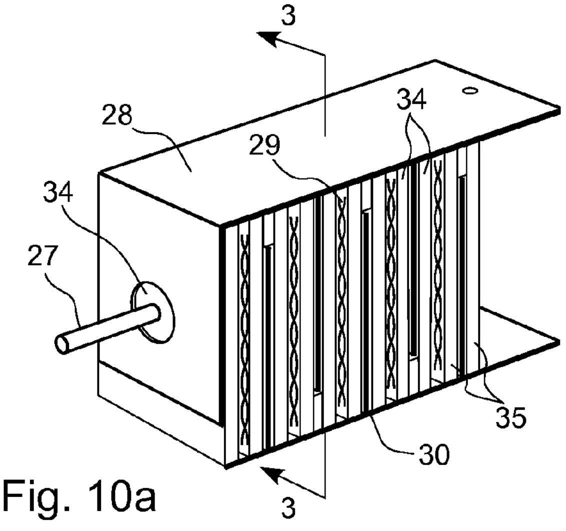
FIG. 10*a* is a perspective view of an embodiment of part of the conversion array sub-stage of the invention, shown in FIG. 9, illustrating the center array layers connected to a rod or wire which is disposed coaxially.

FIG. 10*a* illustrates one embodiment of the apparatus, similar to the array illustrated in FIG. 8*a*. However, rather than the center layer grid are connected to a rod mounted co-axially, and this provide the collector-to-array connection 24.

Figure 10B:
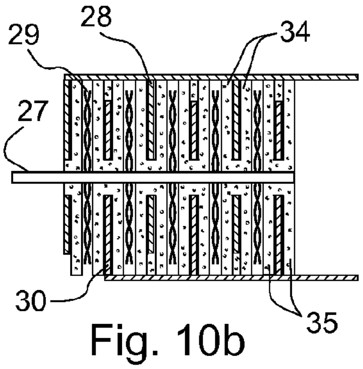
FIG. 10*b* is a section view of the embodiment shown in FIG. 10*a*, illustrating the center array layers connected to a rod or wire which is disposed coaxially.

FIG. 10*b* (Section 3-3) is a cross-section of the embodiment in FIG. 10*a*.

Figure 11:
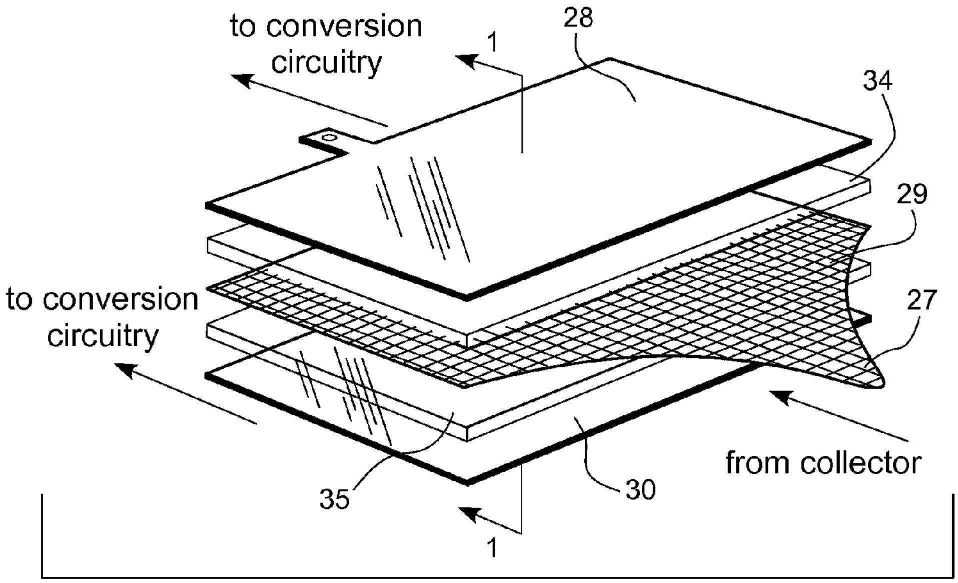
FIG. 11 is a perspective view of an embodiment of part of the conversion array sub-stage of the apparatus, illustrating a single grid layer disposed between a single anode plate layer and a single cathode plate layer, with their respective dielectric layers between the grid and the plates, and tabs to allow electrical connection to the rest of the apparatus.

FIG. 11 is an exploded perspective mechanical view of another embodiment of part of the conversion section of the apparatus, illustrating a single center grid(s) disposed between a single anode plate(s) and a single cathode plate(s), illustrating the sandwiching of the layers and tabs to allow electrical connections.

Figure 12:
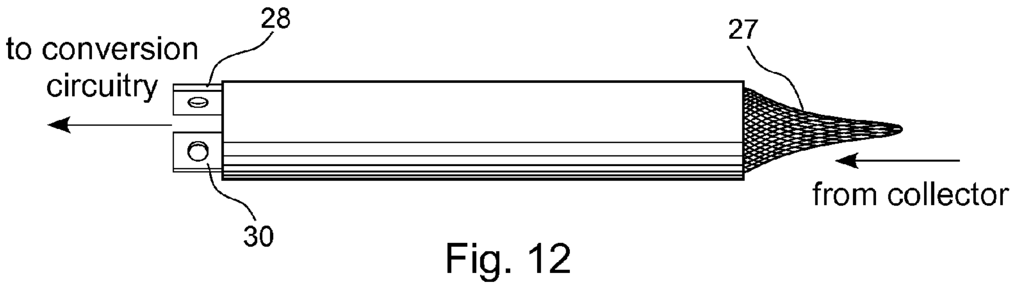
FIG. 12 is a side elevation view of the embodiment shown in FIG. 11, in which the array has been rolled into a cylinder, and the tabs for the anode and cathode plates are shown on the conversion end and the center grid has been rolled and twisted into a point on the collector end.

FIG. 12 is a side mechanical view of another embodiment of part of the conversion section of the apparatus illustrated in FIG. 11, illustrating the sandwich of grids and plates and dielectrics rolled into a cylinder, with the tabs for connection to the conversion circuitry 37 on the left and the grid arranged for connecting to the collector 27 on the right.

Figure 13A:
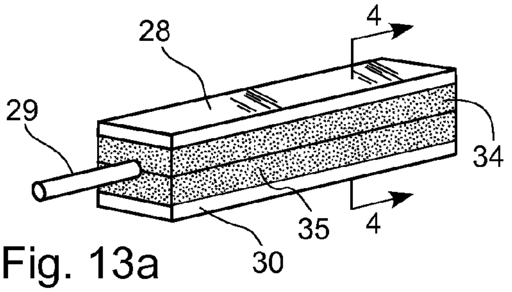
FIG. 13*a* is a perspective view of an embodiment of part of the conversion array sub-stage in which the array is in a rectangular configuration, with the center layer replaced by a rod or wire, with an anode layer disposed on one side of the rod or wire, and a cathode layer disposed on the opposite side of the rod or wire.

FIG. 13*a* is a perspective mechanical view of another embodiment of the apparatus, showing a co-axially mounted wire instead of a grid, with one anode plate and one cathode plate disposed on either side of the wire.

Figure 13B:
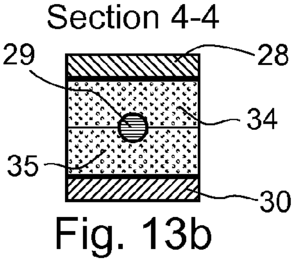
FIG. 13*b* is a cross-section of the embodiment in FIG. 13*a;*

FIG. 13*b* is a cross-section of the embodiment in FIG. 13*a;*

Figure 14A:
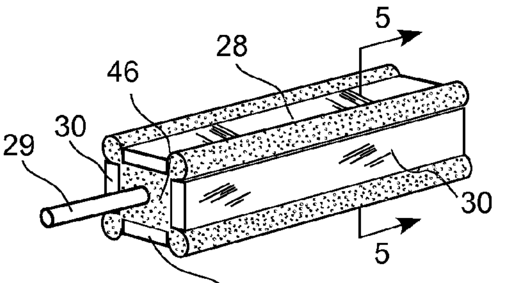
FIG. 14*a* is a perspective view of an embodiment of part of the conversion array sub-stage of the invention, in which the array is in a rectangular configuration, with the center layer replaced by a rod or wire, with two anode plates disposed on either side of the wire, and two cathode plates disposed at ninety degrees to the anode plates, also illustrating the use of a common dielectric.

FIG. 14*a* is a perspective mechanical view of another embodiment of the apparatus, showing a wire instead of a grid, with two anode plates disposed on either side of the wire, and two cathode plates disposed at ninety degrees to the anode plates. It also illustrates the use of a common dielectric 46.

Figure 14B:
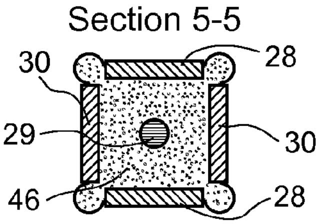
FIG. 14*b* is a cross-section of the embodiment of 14*a;*

FIG. 14*b* is a cross-section of the embodiment of 14*a*.

Figure 15A:
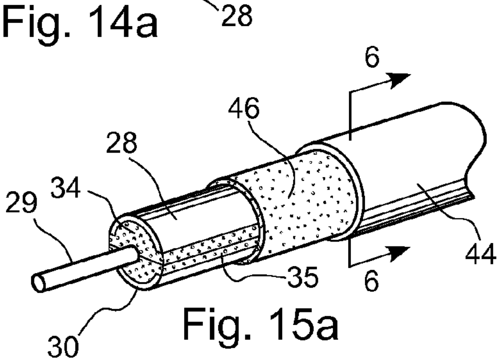
FIG. 15*a* is a perspective cutaway view of an embodiment of part of the conversion array sub-stage of the invention, similar in form to coaxial cabling, with a wire instead of a grid as the center layer(s) 29, and the anode and cathode plates disposed co-axially on either side of the center wire.

FIG. 15*a* is a perspective mechanical view of another embodiment of the apparatus, designed like cabling, with a wire instead of a grid as the center layer(s) 29, and the anode and cathode plates disposed co-axially on either side of the center wire.

Figure 15B:
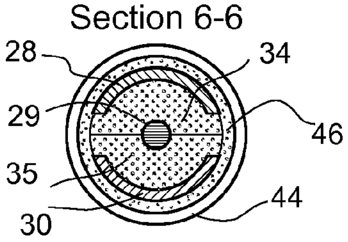
FIG. 15*b* is a cross-section of the embodiment of 15*a;*
Figure 16A:
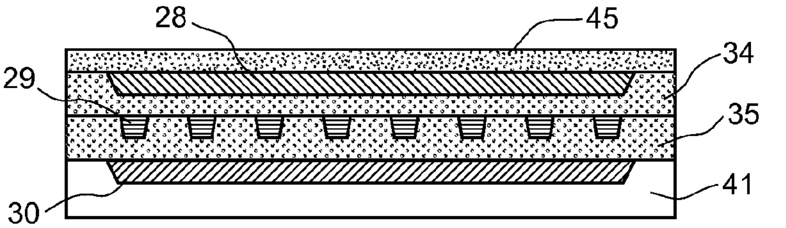
FIG. 16*a* is a cross-section through a semiconductor embodiment of part of the conversion array sub-stage of the invention, illustrating the center deposition layer disposed between the anode deposition layer(s), and the cathode deposition layer(s), which are disposed atop a base layer. It also illustrates the dielectric anode and cathode deposition layer(s) disposed between the anode, center, and cathode deposition layers. It also illustrates a protective layer disposed atop the anode layer.

FIG. 15*b* is a cross-section of the embodiment of 15*a* FIG. 16*a* is a cross-section through a semiconductor embodiment of the array portion of the apparatus, illustration the anode deposition layer(s) 38, the center deposition layer(s) 39, and the cathode deposition layer(s) 40, atop the base layer 41. It also illustrates anode dielectric deposition layer(s) 42, and cathode dielectric deposition layer(s) 43, as well as a protective layer 45.

Figure 16B:
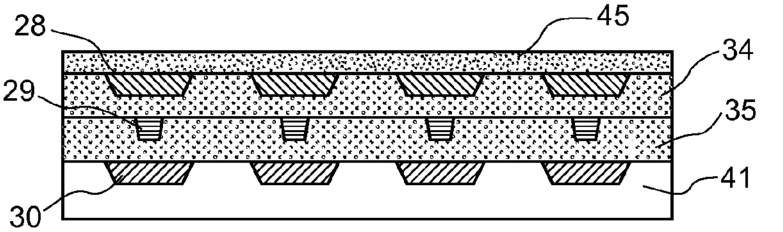
FIG. 16*b* is a cross-section through another semiconductor embodiment of the conversion array sub-stage of the apparatus, similar to that of FIG. 16*a*, but illustrating multiple anode and cathode pads.

FIG. 16*b* is a cross-section through a semiconductor embodiment of the apparatus, similar to that of FIG. 16*a*, with multiple anode and cathode pads.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for dispersal and discharge of static electricity or excess electrical charge for the collection and dissipation or discharge of static or excess electrical charge without the need for an earth ground or atmosphere, comprising:

means for collecting electrically charged particles;

means for entraining the charged particles in an electromagnetic field and converting the charges into electrical energy, electrically connected to said means for collecting electrically charged particles;

means for using the converted electrical charges to provide power to an emitting device that converts the electrical energy to another form, such as light or sound, electrically connected to said means for entraining the charged particles in an electromagnetic field and converting the charges into electrical energy;

means for an electrical connection between the collector(s) and the center layer(s) in the conversion sub-stage;

means for an electrical connection between the anode layers(s) and the emissive stage;

means for an electrical connection between the cathode layer(s) and the emissive stage;

means for an apparatus for electrically charged particles to be collected, electrically connected to said means for an electrical connection between the collector(s) and the center layer in the conversion sub-stage;

means for entraining the charged particles;

means for an area for the charges to collect and be attracted to one of the outer layers for conversion to current, electrostatically coupled to said means for entraining the charged particles, and electrically connected to said means for an electrical connection between the collector(s) and the center layer(s) in the conversion sub-stage;

means for entraining the charged particles, electrostatically coupled to said means for an area for the charges to collect and be attracted to one of the outer layers for conversion to current, and electrostatically coupled to said means for entraining the charged particles;

means for control of the flow of current from the anode layer(s), electrically connected to said means for entraining the charged particles;

means for conversion and emission of electrical current as another form of energy, electrically connected to said means for control of the flow of current from the anode layer(s);

means for control of the flow of current to the cathode layer(s), electrically connected to said means for conversion and emission of electrical current as another form of energy, and electrically connected to said means for entraining the charged particles;

means for a layer to isolate the anode layer(s) from the center layer(s), adjacently placed to said means for an area for the charges to collect and be attracted to one of the outer layers for conversion to current, and adjacently placed to said means for entraining the charged particles;

means for a layer to isolate the cathode layer(s) from the center layer(s), adjacently placed to said means for entraining the charged particles, and adjacently placed to said means for an area for the charges to collect and be attracted to one of the outer layers for conversion to current; and means for converting the charges entrained into electrical energy.

2. The apparatus for dispersal and discharge of static electricity in accordance with claim 1, wherein said means for collecting electrically charged particles comprises a collector stage.

3. The apparatus for dispersal and discharge of static electricity in accordance with claim 1, wherein said means for entraining the charged particles in an electromagnetic field and converting the charges into electrical energy comprises a conversion stage.

4. The apparatus for dispersal and discharge of static electricity in accordance with claim 1, wherein said means for using the converted electrical charges to provide power to an emitting device that converts the electrical energy to another form, such as light or sound comprises an emissive stage.

5. The apparatus for dispersal and discharge of static electricity in accordance with claim 1, wherein said means for an electrical connection between the collector(s) and the center layer in the conversion sub-stage comprises a collector-to-array connection.

6. The apparatus for dispersal and discharge of static electricity in accordance with claim 1, wherein said means for an electrical connection between the anode layers(s) and the emissive stage comprises an anode-to-emitter connection.

7. The apparatus for dispersal and discharge of static electricity in accordance with claim 1, wherein said means for an electrical connection between the cathode layer(s) and the emissive stage comprises a cathode-to-emitter connection.

8. The apparatus for dispersal and discharge of static electricity in accordance with claim 1, wherein said means for an apparatus for electrically charged particles to be collected comprises a collector.

9. The apparatus for dispersal and discharge of static electricity in accordance with claim 1, wherein said means for entraining the charged particles comprises an anode layer(s).

10. The apparatus for dispersal and discharge of static electricity in accordance with claim 1, wherein said means for an area for the charges to collect and be attracted to one of the outer layers for conversion to current comprises a center layer(s).

11. The apparatus for dispersal and discharge of static electricity in accordance with claim 1, wherein said means for entraining the charged particles comprises a cathode layer(s).

12. The apparatus for dispersal and discharge of static electricity in accordance with claim 1, wherein said means for control of the flow of current from the anode layer(s) comprises an anode layer diode.

13. The apparatus for dispersal and discharge of static electricity in accordance with claim 1, wherein said means for conversion and emission of electrical current as another form of energy comprises a light-emitting diode, laser, piezoelectric crystal, flash tube, or other circuit emissive device.

14. The apparatus for dispersal and discharge of static electricity in accordance with claim 1, wherein said means for control of the flow of current to the cathode layer(s) comprises a cathode layer diode.

15. The apparatus for dispersal and discharge of static electricity in accordance with claim 1, wherein said means for a layer to isolate the anode layer(s) from the center layer(s) comprises an anode dielectric layer(s).

16. The apparatus for dispersal and discharge of static electricity in accordance with claim 1, wherein said means for a layer to isolate the cathode layer(s) from the center layer(s) comprises a cathode dielectric layer(s).

17. The apparatus for dispersal and discharge of static electricity in accordance with claim 1, wherein said means for supplying the layer(s) with a bias voltage comprises a power supply.

18. The apparatus for dispersal and discharge of static electricity in accordance with claim 1, wherein said means for converting the charges entrained into electrical energy comprises a conversion circuitry.

19. An apparatus for dispersal and discharge of static electricity for the collection and dissipation or discharge of static electrical charge without the need for an earth ground or atmosphere, comprising:

a collector stage, for collecting electrically charged particles;

a conversion stage, for entraining the charged particles in an electromagnetic field and converting the charges into electrical energy, electrically connected to said collector stage;

an emissive stage, for using the converted electrical charges to provide power to an emitting device that converts the electrical energy to another form, such as light or sound, electrically connected to said conversion stage;

a collector-to-array connection, for an electrical connection between the collector(s) and the center layer in the conversion sub-stage;

an anode-to-emitter connection, for an electrical connection between the anode layers(s) and the emissive stage;

a cathode-to-emitter connection, for an electrical connection between the cathode layer(s) and the emissive stage;

a collector, for an apparatus for electrically charged particles to be collected, electrically connected to said collector-to-array connection;

an anode layer(s), for entraining the charged particles;

a center layer(s), for an area for the charges to collect and be attracted to one of the outer layers for conversion to current, electrostatically coupled to said anode layer(s), and electrically connected to said collector-to-array connection;

a cathode layer(s), for entraining the charged particles, electrostatically coupled to said center layer(s), and electrostatically coupled to said anode layer(s);

an anode layer diode, for control of the flow of current from the anode layer(s), electrically connected to said anode layer(s);

a light-emitting diode, laser, piezoelectric crystal, flash tube, or other circuit emissive device, for conversion and emission of electrical current as another form of energy, electrically connected to said anode layer diode;

a cathode layer diode, for control of the flow of current to the cathode layer(s), electrically connected to said emissive device, and electrically connected to said cathode layer(s);

a light-emitting diode, laser, piezoelectric crystal, flash tube, or other circuit emissive device, for conversion and emission of electrical current as another form of energy, electrically connected to said cathode layer diode;

an anode dielectric layer(s), for a layer to isolate the anode layer(s) from the center layer(s), adjacently placed to said center layer(s), and adjacently placed to said anode layer(s);

a cathode dielectric layer(s), for a layer to isolate the cathode layer(s) from the center layer(s), adjacently placed to said cathode layer(s), and adjacently placed to said center layer(s); and a conversion circuitry, for converting the charges entrained into electrical energy.

20. An apparatus for dispersal and discharge of static electricity for the collection and dissipation or discharge of static electrical charge without the need for an earth ground or atmosphere, comprising:

a collector stage, for collecting electrically charged particles;

a conversion stage, for entraining the charged particles in an electromagnetic field and converting the charges into electrical energy, electrically connected to said collector stage;

an emissive stage, for using the converted electrical charges to provide power to an emitting device that converts the electrical energy to another form, such as light or sound, electrically connected to said conversion stage;

a collector-to-array connection, for an electrical connection between the collector(s) and the center layer in the conversion sub-stage;

an anode-to-emitter connection, for an electrical connection between the anode layers(s) and the emissive stage;

a cathode-to-emitter connection, for an electrical connection between the cathode layer(s) and the emissive stage;

a collector, for an apparatus for electrically charged particles to be collected, electrically connected to said collector-to-array connection;

an anode layer(s), for entraining the charged particles;

a center layer(s), for an area for the charges to collect and be attracted to one of the outer layers for conversion to current, electrostatically coupled to said anode layer(s), and electrically connected to said collector-to-array connection;

a cathode layer(s), for entraining the charged particles, electrostatically coupled to said center layer(s), and electrostatically coupled to said anode layer(s);

an anode layer diode, for control of the flow of current from the anode layer(s), electrically connected to said anode layer(s);

a light-emitting diode, laser, piezoelectric crystal, flash tube, or other circuit emissive device, for conversion and emission of electrical current as another form of energy, electrically connected to said anode layer diode;

a cathode layer diode, for control of the flow of current to the cathode layer(s), electrically connected to said emissive device, and electrically connected to said cathode layer(s);

a light-emitting diode, laser, piezoelectric crystal, flash tube, or other circuit emissive device, for conversion and emission of electrical current as another form of energy, electrically connected to said cathode layer diode;

an anode dielectric layer(s), for a layer to isolate the anode layer(s) from the center layer(s), adjacently placed to said center layer(s), and adjacently placed to said anode layer(s);

a cathode dielectric layer(s), for a layer to isolate the cathode layer(s) from the center layer(s), adjacently placed to said cathode layer(s), and adjacently placed to said center layer(s);

a power supply, for supplying the layer(s) with a bias voltage; and a conversion circuitry, for converting the charges entrained into electrical energy.

* * * * *